US011782691B2

(12) United States Patent
Sangameswaran et al.

(10) Patent No.: US 11,782,691 B2
(45) Date of Patent: Oct. 10, 2023

(54) METHOD AND APPARATUS FOR OVER THE AIR UPDATES

(71) Applicant: Ford Global Technologies, LLC, Dearborn, MI (US)

(72) Inventors: Sangeetha Sangameswaran, Canton, MI (US); John Naum Vangelov, South Lyon, MI (US); Daniel Joseph Madrid, Livonia, MI (US); Chad Evert Esselink, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1957 days.

(21) Appl. No.: 15/047,722

(22) Filed: Feb. 19, 2016

(65) Prior Publication Data

US 2017/0242679 A1    Aug. 24, 2017

(51) Int. Cl.
*G06F 9/445* (2018.01)
*H04L 29/08* (2006.01)
*G06F 8/65* (2018.01)
*H04L 67/12* (2022.01)
*H04L 67/00* (2022.01)

(52) U.S. Cl.
CPC ............... *G06F 8/65* (2013.01); *H04L 67/12* (2013.01); *H04L 67/34* (2013.01)

(58) Field of Classification Search
CPC ............ G06F 8/65; H04L 67/12; H04L 67/34
USPC ........................................................ 717/173
See application file for complete search history.

(56) References Cited

U.S. PATENT DOCUMENTS

| 2006/0075001 | A1* | 4/2006 | Canning et al. ........... G06F 8/65 |
| 2008/0189693 | A1 | 8/2008 | Pathak |
| 2009/0270176 | A1* | 10/2009 | Motyl et al. ............ G07F 17/32 463/42 |
| 2010/0070965 | A1* | 3/2010 | Britten et al. ............. G06F 8/65 717/173 |
| 2010/0228404 | A1* | 9/2010 | Link, II et al. ..... G06F 9/44542 701/1 |
| 2013/0031540 | A1* | 1/2013 | Throop et al. .......... G06F 8/654 717/173 |

(Continued)

FOREIGN PATENT DOCUMENTS

| CN | 103593208 A | 2/2014 |
| CN | 105204887 A | 12/2015 |

OTHER PUBLICATIONS

Movimento, The Platform Support for Legacy Vehicles Also Enables Remote Vehicle Diagnostics and Includes Advanced In-Vehicle Cybersecurity, Paragraph 2, http://www.businesswire.com/news/home/20150602005268/en/Movimento-Launches-OTA-Platform-Update-Car-Module#.Ve7_3f50xtQ.

*Primary Examiner* — Wei Y Zhen
*Assistant Examiner* — Mohammed N Huda
(74) *Attorney, Agent, or Firm* — Joseph Zane; Brooks Kushman P.C.

(57) ABSTRACT

A system includes a processor configured to, in response to a notification received from a remote network that an update to vehicle software is available, assemble a list of installed vehicle software versions. The processor is also configured to transmit the list of installed versions to a remote update server. The processor is further configured to receive a list of available updates compatible with the installed vehicle software versions in response to the transmission. Additionally, the processor is configured to download at least one of the available updates and install the downloaded updates.

3 Claims, 3 Drawing Sheets

(56) References Cited

U.S. PATENT DOCUMENTS

| | | | |
|---|---|---|---|
| 2013/0073864 A1 | 3/2013 | Sarkar et al. | |
| 2013/0179872 A1* | 7/2013 | Kuzmack et al. | G06F 8/65 717/171 |
| 2014/0040875 A1* | 2/2014 | Bower, III et al. | G06F 8/65 717/170 |
| 2014/0109075 A1* | 4/2014 | Hoffman et al. | G06F 8/65 717/169 |
| 2014/0282467 A1 | 9/2014 | Mueller et al. | |
| 2014/0282476 A1* | 9/2014 | Ciudad et al. | G06F 8/65 717/171 |
| 2015/0095898 A1 | 4/2015 | Mitchell et al. | |
| 2015/0191122 A1* | 7/2015 | Roy et al. | G08G 1/091 340/439 |
| 2015/0242198 A1 | 8/2015 | Tobolski et al. | |
| 2016/0294614 A1* | 10/2016 | Searle et al. | G06F 8/65 |
| 2016/0371077 A1* | 12/2016 | Moeller et al. | |

\* cited by examiner

METHOD AND APPARATUS FOR OVER THE AIR UPDATES

TECHNICAL FIELD

The illustrative embodiments generally relate to a method and apparatus for over the air updates.

BACKGROUND

Many vehicles include telematics units and vehicle computing and infotainment systems. These systems allow for integration of applications from remote sources, playback of media and content in a vehicle, communication with remote sources and generally provide a more favorable driver experience. These systems and other vehicle electronic control units (ECU) may include updateable software/firmware components to provide compatibility among components, for example. However, customers may be required to visit a dealer to receive updates and/or have the systems scanned to determine whether updated software is available. Current strategies may require physically connecting the vehicle to a programming system to have the updates installed by the dealer. This allows the dealer to ensure that the most recent modules and versions are installed and allows the original equipment manufacturer (OEM) to obtain a snapshot of the current software and firmware versions installed on a vehicle.

SUMMARY

In a first illustrative embodiment, a system includes a processor configured to, in response to a notification received from a remote network that an update to vehicle software is available, assemble a list of installed vehicle software versions. The processor is also configured to transmit the list of installed versions to a remote update server. The processor is further configured to receive a list of available updates compatible with the installed vehicle software versions in response to the transmission. Additionally, the processor is configured to download at least one of the available updates and install the downloaded updates.

In a second illustrative embodiment, a system includes a processor configured to receive a list of vehicle identification numbers (VIN)s to which an available software update applies. The processor is also configured to determine, for each VIN, if a vehicle-owner has approved over the air (OTA) updates and send a notification to each vehicle, identified by a corresponding In a third illustrative embodiment, a system includes one or more processors configured to receive a software update. The processor(s) are also configured to provide notification to a vehicle, for which a database record indicates an installed software version to which the received update applies and receive a software-update download request from the vehicle. Further, the processor(s) are configured to transmit the software update responsive to the request, receive an update log including success or failure of installation of the software update, and update the database record based on the log.

DETAILED DESCRIPTION

As required, detailed embodiments are disclosed herein; however, it is to be understood that the disclosed embodiments are merely illustrative of the claimed subject matter that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
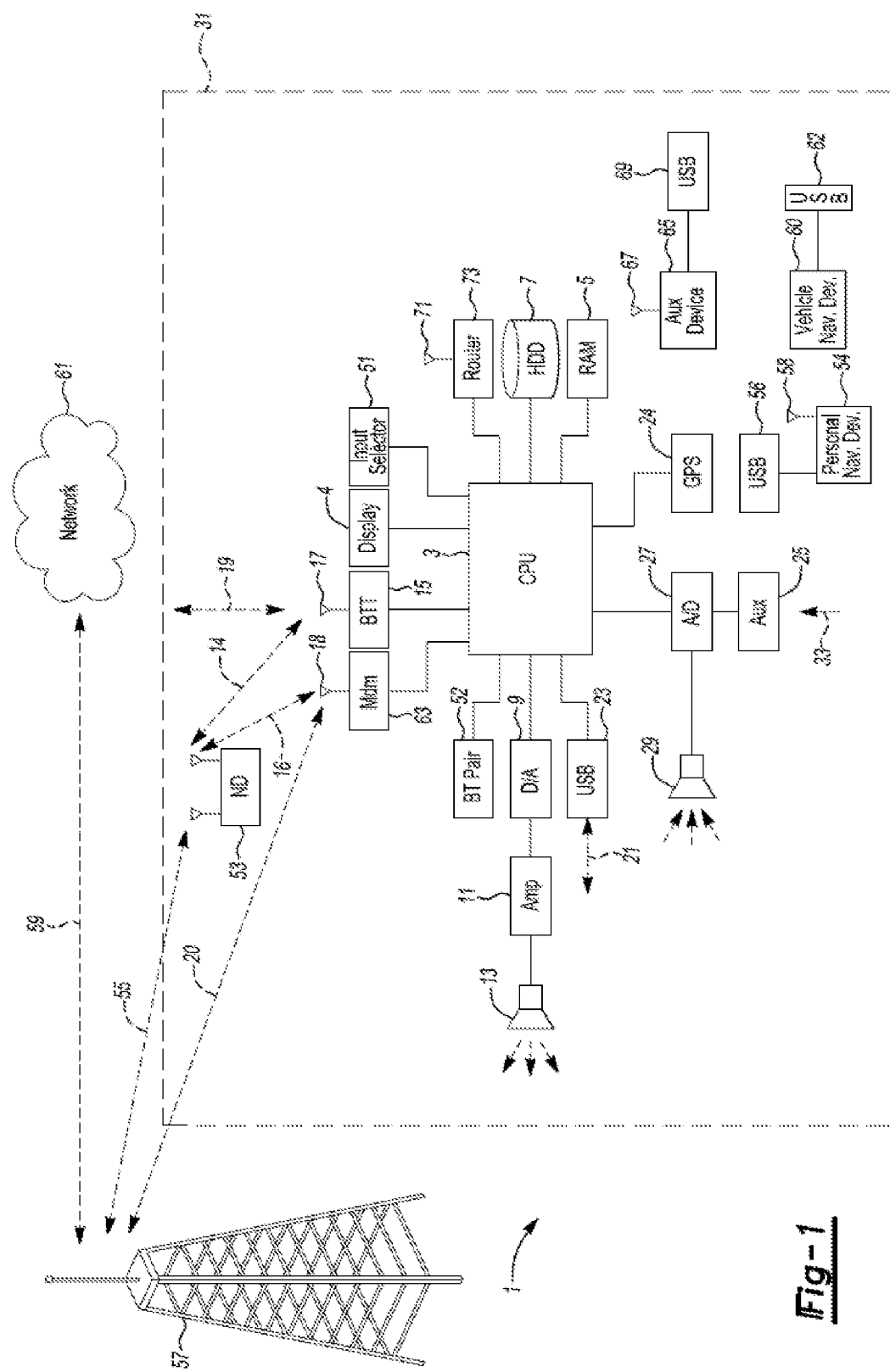
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may be able to interact with the interface if it is provided, for example, with a touch sensitive screen. In another illustrative embodiment, the interaction occurs through button presses and/or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Representative communication between the nomadic device and the BLUETOOTH transceiver is represented by signal 14. Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Free-space optical communication (such as IrDA) and non-standardized consumer IR protocols may also be used.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having representative processes executed by a vehicle computing system located in a vehicle, in certain embodiments, the processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, a representative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

While current vehicle computing systems allow for complete updating of software and firmware via a dealer interface, such systems also require that the customer visit a dealer or other licensed service provider. This can create a delay in obtaining updates, as customers will frequently wait until the vehicle needs physical servicing, is due for an oil change or tire rotation, or simply fail to have the software updated altogether. Since the software and firmware updates frequently improve performance, customers may not be getting the full, optimal experience from their vehicle unless they make it a point to keep their software up to date, which, under the dealer-update model, may require frequent trips to a dealer or maintenance location for updating.

The illustrative embodiments provide representative systems and methods for obtaining over-the-air (OTA) updates that allow a customer to update vehicle software without having to visit a dealer. The proposed solutions and examples provide an efficient and reliable means of updating vehicle software and firmware, with minimal customer interaction and impact. Also, the OEM can track which updates have been provided and/or applied to which vehicles, so it is possible to have a good sense of which software and firmware versions are highly prevalent in deployed vehicles, which can assist in focusing update efforts and allow for early identification of issues and notification of the appropriate parties if, for example, any version-specific issues arise.

Figure 2A:
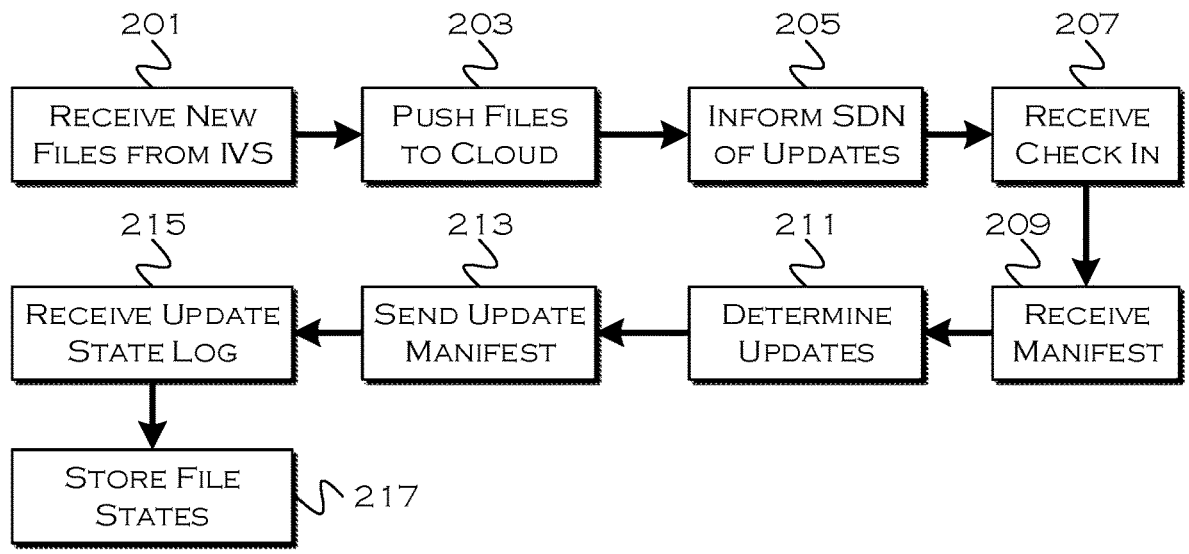
FIG. 2A shows an illustrative cloud-side process for providing a vehicle software/firmware update.

FIG. 2A shows an illustrative cloud-side process for providing a vehicle software/firmware update. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, an OEM engineer or other party designated to provide software and firmware updates can upload the software to an initial system repository, such as an in-vehicle software system (IVS) that is designated to receive updates from one or more parties. These files are then sent to a global in-vehicle information system (GIVIS) where the software can be stored for download by vehicle tools. After the GIVIS system receives the software from the IVS system 201, the GIVIS system can push the software to the cloud 203, which is where the software can be provided to remotely connected vehicle telematic control units (TCU) s.

In addition to pushing the files to the cloud (or otherwise making the files wirelessly available), the GIVIS system can tell a service delivery network (SDN) to inform particular vehicles that an update to an installed software or firmware package is available 205 for download and installation.

In the illustrative embodiments, the backend OEM systems track which modules and versions are installed on a variety of vehicles that have allowed for OTA updates. This is information that can be received, for example, from a vehicle TCU and stored in a remote OEM database. For vehicles whose configuration is known, the SDN can identify which vehicles are appropriate for an update (based on known, installed software and firmware versions) and can send a message to those vehicles that a new package is ready for download. For other vehicles, that may not have reported yet, for example, the system can identify vehicles for updating based on initial builds, and can notify those systems as well. Since, in this example, the process will vet the installed software before providing the update, any incompatibility can be handled when the system is informed of the actual configuration.

As identified vehicles come online (e.g., without limitation, they are keyed-on), they can check-in with the update server based on the notification from the SDN, for example. The system receives the check-in 207 and a manifest of installed software and firmware on the vehicle 209. This could be a full list, or, in another example, could relate specifically to software packages and firmware packages which have been designated for update. The full list will provide the OEM with a current snap-shot of the vehicle, but the short list may take less time to assemble and transmit. The report can be configured as desired based on the trade-offs between transmission time, completeness, data-volume, etc.

Figure 2B:
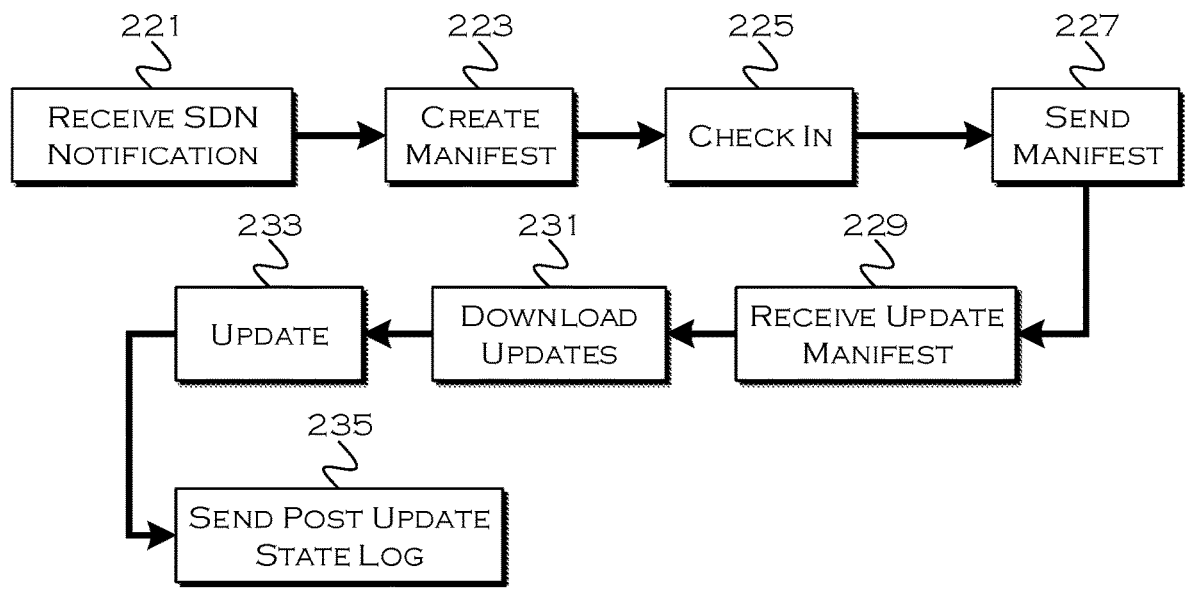
FIG. 2B shows an illustrative vehicle-side process for update handling.

Once the manifest is received from the vehicle 209, the process can determine which software and firmware is appropriate for updating, and assemble a list of available updates 211. This update manifest, identifying the updateable software/firmware and/or versions available for download, can then be sent to the vehicle 213. As shown in FIG. 2B, the vehicle will download appropriate software and, at some point when appropriate, install the software updates. Once the software updates have been successfully installed, the process will receive a state log identifying the success or failure of various update installations 215. This can be at a later point in time, since, for example, the download may occur at key-on and the install may occur at key-off (when the vehicle is not being used). The remote system can then store an updated snapshot 217 of some or all of the installed versions of software and firmware (depending on how much data is provided in the initial manifest and the update state log).

FIG. 2B shows an illustrative vehicle-side process for update handling. With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process is a vehicle-side process which may not necessarily run to completion without pausing (i.e., there may be significant time-gaps between certain steps). The vehicle is notified, typically through the vehicle TCU, that an updated software package is available for that vehicle 221. This SDN notification can be used to place the vehicle in a state where the vehicle will check for an update when the vehicle is next keyed-on, for example.

At key-on, in response to the SDN notification, or at another appropriate time, the process will create a manifest of existing software and firmware versions installed on the vehicle 223. This can be a complete list of software and firmware, or can be limited, for example, to the versions of software and firmware for which an update is available. A third example of a list could be the versions of updateable software and firmware, as well as the versions of other modules that might be required for compatibility purposes (e.g., even if module Z is not updateable, it might have to be in version 2.0.1 for an update to module N to preserve compatibility, so the versions of both Z and N might be provided). Then, again at key-on or other designated time, the process will check-in with the GIVIS cloud 225 (or other software/firmware providing service) to obtain the updated software.

The process sends the manifest of installed versions to the GIVIS system 227, which allows the GIVIS system to check to ensure, for example, that the database record of installed software is correct. If the vehicle system has an unexpected updated version (which, for example, the user may have manually installed), the update may be aborted, or changed to a different update. Once the appropriateness of the updates has been verified or corrected, the vehicle system will receive an update manifest containing a list of the updateable software modules available for download 229.

The vehicle system will then download the appropriate updates (which could be all updates or some system or user selected subset thereof) 231. At some point the updates will also be installed 233, although as previously noted this could be at a different time. Since updates to vehicle modules may affect drivability while being installed, it may be desirable to wait until a vehicle is not being used (such as at key-off) before installing the updates. In another example, for a quick update, the system may simply prevent driving for a limited period of time while an update is applied. This latter model could be used, for example, when a high-priority security update is downloaded for installation, or at any other appropriate time. Once the updates have been installed, the process can send a post-update log to the GIVIS system 235, which can include the success or failure of updates, and may also include another full listing of presently installed software and firmware modules, if desired to maximize information about a present vehicle configuration.

Although not shown, it is also possible, for example, for the process to log or record the transmission of certain software version updates to a vehicle. This can help, for example, in identifying an update issue if a vehicle repeatedly receives updated versions but fails to successfully apply the update upon attempting an update.

Figure 3:
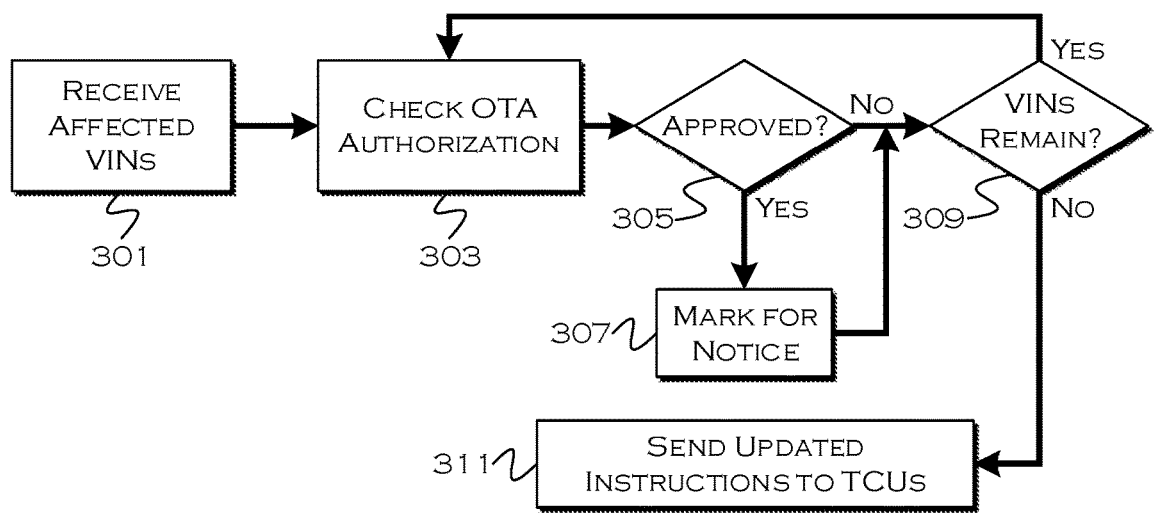
FIG. 3 shows an illustrative process for update notification.

FIG. 3 shows an illustrative process for update notification. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process runs on a service delivery network or other communication system designated for notifying vehicles about the availability of new updates. In this example, the process receives (or retrieves) the vehicle identification numbers (VIN)s of vehicles affected by a particular update 301.

The software and firmware configuration for each vehicle is stored in a database that may be populated and updated using various sources (from vehicle-reporting, dealer-reporting, known installed versions at production, etc.). The database can be queried, for example, to identify vehicles having a particular version of software N installed, such as vehicles having version 2.0.3, for example, to which a new update 2.0.4 is to be applied. In other examples, all vehicles having versions at or lower than 2.0.3 might be identified as candidates for updating to 2.0.4, depending, for example, on the particular update.

The vehicles can be identified by VIN, which can also be used to look up communication data allowing for messages to be sent to the specific, VIN-identified vehicles. In this example, to prevent notification to users who do not want OTA updates, the process checks each VIN to see if the user has agreed to the OTA updates 303. VINs that are not in the database may correspond to users that have not yet approved OTA updates, or that may not want OTA updates for a variety of reasons (such as a fleet manager who wants all vehicles at a same version level). If a given VIN has an approval associated therewith 305, the SDN can add that VIN to a list for notification 307. This process can continue as long as VINs remain 309 for approval verification. Once the VINs that have approved OTA updates have all been verified, the process can send update instructions, notifications, etc. 311 to the vehicles having the associated VINs.

Figure 4:
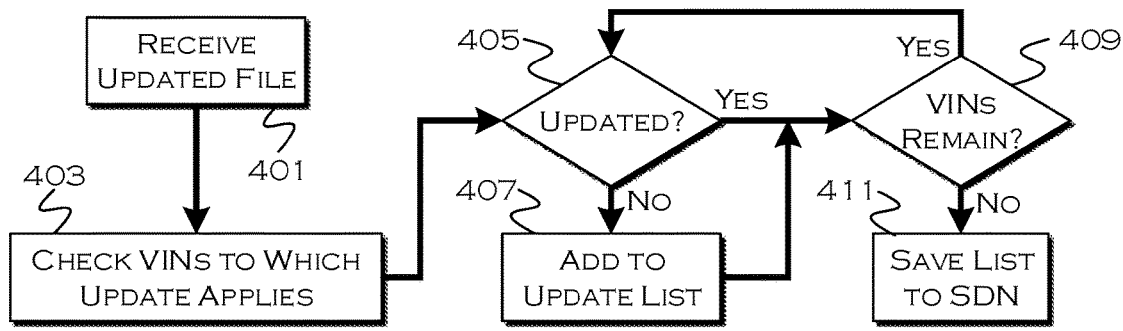
FIG. 4 shows another illustrative update notification process.

FIG. 4 shows another illustrative update notification process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on the GIVIS, for example, receives an updated file from an OEM engineer or other party designated to provide updates 401. In this example, the GIVIS stores the records (or accesses the database storing the records) of vehicle configurations, and will simply provide a list of applicable VINs to the SDN for notification (which is the representative process described with respect to FIG. 3). Here, the process utilizes a database to determine which vehicles (by VIN, in this example) have software eligible for the received update 403. In this example, the process first sorts by software module 403, to determine which vehicles have the updateable module installed. Then, for each vehicle, the process determines if the software has already been updated 405 or is otherwise an inappropriate state for updating. If the software is already updated or is otherwise in an inappropriate state for updating 405, the process will continue to the next record 409. Otherwise, the VIN for that vehicle is added to an update list 407 to be sent to the SDN. Of course, any method of querying a database and assembling a list of records can be used, as the process shown is merely illustrative. Once all records have been analyzed, the process can send the list of appropriate VINs to the SDN, which can check for stored OTA approval as shown in FIG. 3. Although the GIVIS process in FIG. 4 and the OTA approval verification shown in FIG. 3 are described with respect to separate systems, they can be consolidated if desired and appropriate, depending on the layout and configuration of the back-end network providing the OTA software updates.

Figure 5:
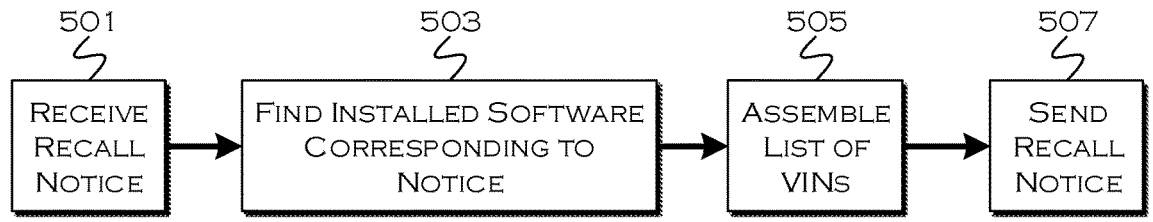
FIG. 5 shows an illustrative process for recall handling.

FIG. 5 shows an illustrative process for recall handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 5 shows an illustrative recall notification process facilitated by having a more up-to-date record of currently installed software and firmware versions. While this could be used with any set of records reporting software and firmware versions installed in vehicles, the more up-to-date the records, the more accurate the delivery of the recall notices. If an OEM does not have any information about current software versions, for example, they may have to send a recall notice to all vehicle models having some version of a particular software or firmware module needing a particular update. On the other hand, if the update only applies, for example, to version 3.3.1, a complete or more-complete set of records can avoid issuing a recall notice to at least some vehicles for which the notice is inappropriate. For vehicles whose current configuration is unknown, or for which it has been a long time since update, the process may still choose to send the notice out of an abundance of caution. However, the process can avoid sending notices to vehicles for which it is known that the update has already been applied and/or which have versions that are past the version needing updating (3.3.2, for example).

The process receives a recall notice that applies to a particular software or firmware module installed in certain vehicles 501. Using database queries such as those previously described, the process can identify which vehicles are known to need an update, or, additionally or alternatively, which vehicles do not need an update 503. The process then can assemble a list of VINs for which notification should be sent (or in an alternative configuration, a list of VINs for which a notice is definitely not needed) 505. This list, in either form, can be used to limit the list of vehicles to which notification is sent, so at least some drivers are not unnecessarily notified about a recall which does not apply to their vehicle. The recall notice can then be sent to the appropriate vehicles.

As noted, there may still be some overlap and redundancy in notification using this process, based on incomplete information, but the better the information received from customer vehicles and dealer updates, for example, the more accurately targeted the recall notification can be. Similar methodologies can also be used for other targeted vehicle messaging, based on knowing which modules and versions are installed on which particular vehicles. Because the OTA updates allow for more frequent servicing of software and firmware modules without requiring the customer to make a trip to the dealer, the increased frequency can provide increased snapshot accuracy if such information is collected by the OEM.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a list of vehicle identification numbers (VIN)s to which an available software update applies;
determine, for each VIN, if a vehicle-owner has approved over the air (OTA) updates; and
send a notification only to each vehicle, identified by a corresponding VIN, for which the owner has approved OTA updates and an available software update applies;
download the available software update;
install the downloaded available software update.

2. The system of claim 1, wherein the list of VINs is received from a secondary remote server through which the available software update is provided to vehicles.

3. The system of claim 1, wherein the list is received from a database containing currently installed software versions for each vehicle, identified by VIN, in response to a database query.

* * * * *